(12) United States Patent
Lee et al.

(10) Patent No.: US 9,547,213 B2
(45) Date of Patent: Jan. 17, 2017

(54) DISPLAY DEVICE

(71) Applicant: INDUSTRIAL TECHNOLOGY RESEARCH INSTITUTE, Hsinchu (TW)

(72) Inventors: Kuo-Chang Lee, Pingtung (TW); Kuo-Lung Lo, New Taipei (TW); Wei-Yuan Cheng, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/841,208

(22) Filed: Aug. 31, 2015

(65) Prior Publication Data

US 2016/0178982 A1    Jun. 23, 2016

Related U.S. Application Data

(60) Provisional application No. 62/094,072, filed on Dec. 19, 2014.

(30) Foreign Application Priority Data

May 19, 2015   (TW) .............................. 104115852 A

(51) Int. Cl.
  *G02F 1/15*      (2006.01)
  *G02F 1/155*     (2006.01)
  *F21V 8/00*      (2006.01)

(52) U.S. Cl.
  CPC ............. *G02F 1/155* (2013.01); *G02B 6/0055* (2013.01)

(58) Field of Classification Search
  CPC ............ G02F 1/155; G02F 1/15; G02F 1/153; G02B 6/0055

(Continued)

(56) References Cited

U.S. PATENT DOCUMENTS 8,227,797 B2   7/2012  Seo
8,400,383 B2   3/2013  Cho et al.
(Continued)

FOREIGN PATENT DOCUMENTS

CN    103487989 A    1/2014
CN    103713439 A    4/2014
(Continued)

OTHER PUBLICATIONS

Chou et al., "Roll-to-roll fabrication of a low-reflectance transparent conducting oxide film with subwavelength structures", Journal of Micromechanics and Microengineering, 2012, 22, 045009, 7 Pages.

(Continued)

*Primary Examiner* — Tuyen Tra
(74) *Attorney, Agent, or Firm* — Birch, Stewart, Kolasch & Birch, LLP

(57) ABSTRACT

A display device including a first substrate, a second substrate, a display element layer, a non-transparent structure, an optical guiding structure and a reflective layer is disclosed. The second substrate is disposed opposite to the first substrate adjacent to a display surface of the display device. The display element layer is disposed between the first and the second substrates. The non-transparent structure, located between the optical guiding structure and the display element layer, defines at least one opening of the display device. The optical guiding structure corresponds to the one opening. The optical guiding structure includes a plurality of insulating structures each having a first surface adjacent to the non-transparent structure and side surfaces connected to the first surface. The reflective layer is disposed on the side surfaces. The ambient light entering via the second substrate is reflected by the reflective layer and exists via the opening.

20 Claims, 11 Drawing Sheets

(58) Field of Classification Search
USPC ............. 359/265–275, 222.1, 228, 245, 263, 290,359/296; 345/105, 107
See application file for complete search history.

(56) References Cited

U.S. PATENT DOCUMENTS

| | | | |
|---|---|---|---|
| 8,550,667 B2 | 10/2013 | Kim et al. | |
| 8,558,222 B2 | 10/2013 | Hwang et al. | |
| 8,684,547 B2 | 4/2014 | Kim et al. | |
| 8,743,466 B2 | 6/2014 | Yamamoto | |
| 8,766,959 B2 | 7/2014 | Taneda et al. | |
| 8,773,744 B2* | 7/2014 | Liang | G02B 26/005 359/228 |
| 2007/0057932 A1 | 3/2007 | Shin et al. | |
| 2007/0138941 A1 | 6/2007 | Jin et al. | |
| 2008/0073653 A1 | 3/2008 | Iwasaki | |
| 2008/0266471 A1* | 10/2008 | Hisatake | G02F 1/1323 349/15 |
| 2010/0013741 A1 | 1/2010 | Watanabe | |
| 2010/0079870 A1 | 4/2010 | Cao | |
| 2010/0208497 A1 | 8/2010 | Song et al. | |
| 2012/0327498 A1 | 12/2012 | Arai et al. | |
| 2013/0050798 A1 | 2/2013 | Kim et al. | |
| 2014/0042475 A1 | 2/2014 | Park et al. | |

FOREIGN PATENT DOCUMENTS

| | | |
|---|---|---|
| TW | 200517755 A | 6/2005 |
| TW | 200834929 A | 8/2008 |
| TW | 200930141 A | 7/2009 |
| TW | 200949401 A | 12/2009 |
| TW | 201128771 A1 | 8/2011 |
| TW | 201209489 A | 3/2012 |
| TW | 201327514 A1 | 7/2013 |
| TW | 201411259 A | 3/2014 |

OTHER PUBLICATIONS

Fujisaki et al., "Transparent Nanopaper-Based Flexible Organic Thin-Film Transistor Array", Adv. Funct. Mater., 2014, 24, 1657-1663.

Lee et al., "Cavity effect of transparent organic emitting device using metal cathode", Organic Optoelectronics and Photonics, Proceedings of SPIE, 2004, vol. 5464, pp. 306-313.

Lo et al., "Recent Development of Transparent Electrowetting Display", SID, Digest, 2013, pp. 123-126.

Mun et al., "A high transmittance color liquid crystal display mode with controllable color gamut and transparency", Optical Society of America, May 19, 2014, vol. 22, No. 10, pp. 12505-12512.

Nathan et al., "Transparent Oxide Semiconductors for Advanced Display Applications", Frontline Technology, Information Display, 2013, Jan. 2013, pp. 6-10.

Park et al., "Development of Oxide TFT and Application to the Transparent Display", AMD7-1, Invited, IDW, 2011, pp. 1665-1668.

Su et al., "A New Polymer Dispersed Liquid Crystal Applied in Active-matrix TFT Transparent Display", LCT5-3, IDW/AD, 2012, pp. 1573-1576.

Su et al., "Polymer-Dispersed Liquid Crystal Applied in Active-Matrix Transparent Display", Journal of Display Technology, Aug. 2014, vol. 10, No. 8, pp. 683-687.

Yu et al., "Design of a cholesteric liquid crystal cell for a high-transmittance light shutter", Proc. of SPIE, 2014, vol. 9004, pp. 90040L-1-90040L-5.

Taiwanese Office Action and Search Report for Taiwanese Application No. 104116422, dated Mar. 25, 2016.

Oh et al., "Highly efficient full-color display based on blue LED backlight and electrochromic light-valve coupled with front-emitting phosphors," Optics Express, vol. 19, No. 17, Aug. 15, 2016, 10 pages.

Taiwanese Office Action and Search Report, dated Aug. 29, 2016, for Taiwanese Application No. 104115852.

* cited by examiner

DISPLAY DEVICE

This application claims the benefits of U.S. provisional application Ser. No. 62/094,072, filed Dec. 19, 2014 and Taiwan application Serial No. 104115852, filed May 19, 2015, the disclosures of which are incorporated by reference herein in its entirety.

TECHNICAL FIELD

The disclosure relates to a display device, and also relates to a display device with an optical guiding structure.

BACKGROUND

Nowadays, the applications of flat panel displays in 3C products such as mobile phones, personal digital assistants (PDAs), global positioning systems (GPS), and digital cameras are closely related to people's daily life. Transparent displays, which not only display images or data but further allow users to view the images behind the display, may be used in vending machines, window displays, mall food displays, and museum displays. Display media such as liquid crystal displays (LCD), organic light emitting diode (OLED) displays, and electrowetting displays (EWD) may all be used in transparent displays.

In a transparent display, since metal wires, thin film transistor (TFT), or the ink contraction zone of the electrowetting display all are impermeable to the light, the background light coming from the back of the display has insufficient transmittance, largely affecting users' viewing the images behind the display.

SUMMARY

According to one embodiment, a display device including a first substrate, a second substrate, a display element layer, a non-transparent structure, an optical guiding structure and a reflective layer is disclosed. The second substrate is disposed opposite to the first substrate. The first substrate is adjacent to a display surface of the display device. The display element layer is disposed between the first substrate and the second substrate. The non-transparent structure is disposed between the display element layer and the second substrate, and defines at least one opening of the display device. The optical guiding structure is disposed on the non-transparent structure, and corresponds to at least one opening. The non-transparent structure is located between the optical guiding structure and the display element layer. The optical guiding structure may further include a plurality of insulating structures each having a first surface adjacent to the non-transparent structure and side surfaces connected to the first surface. The reflective layer is disposed on the side surfaces. The ambient light entering the display device via a side of the second substrate is reflected by the reflective layer and exists via the opening.

According to another embodiment, a display device including a first substrate, a second substrate, a display element layer, a non-transparent structure, a plurality of insulating structures and an electrochromic block is disclosed. The second substrate is disposed opposite to the first substrate, and the first substrate is located adjacent to a display surface of the display device. The display element layer is disposed between the first substrate and the second substrate. The non-transparent structure is disposed between the display element layer and the second substrate and defining at least one opening of the display device. The insulating structures are disposed on the non-transparent structure, wherein the non-transparent structure is located between the insulating structures and the display element layer, and each of the insulating structures has a first surface adjacent to the non-transparent structure and side surfaces connected to the first surface. The electrochromic block is located between the non-transparent structure and the second substrate, the electrochromic block including a first transparent electrode, a conductive layer and an electrochromic medium. The first transparent electrode is disposed corresponding to the at least one opening, the conductive layer is disposed on the side surfaces of the insulating structures, and the electrochromic medium is adjacent to the first transparent electrode and the conductive layer.

The disclosure will become better understood with regard to the following detailed description of the preferred but non-limiting embodiment(s). The following description is made with reference to the accompanying drawings.

Figure 1A:
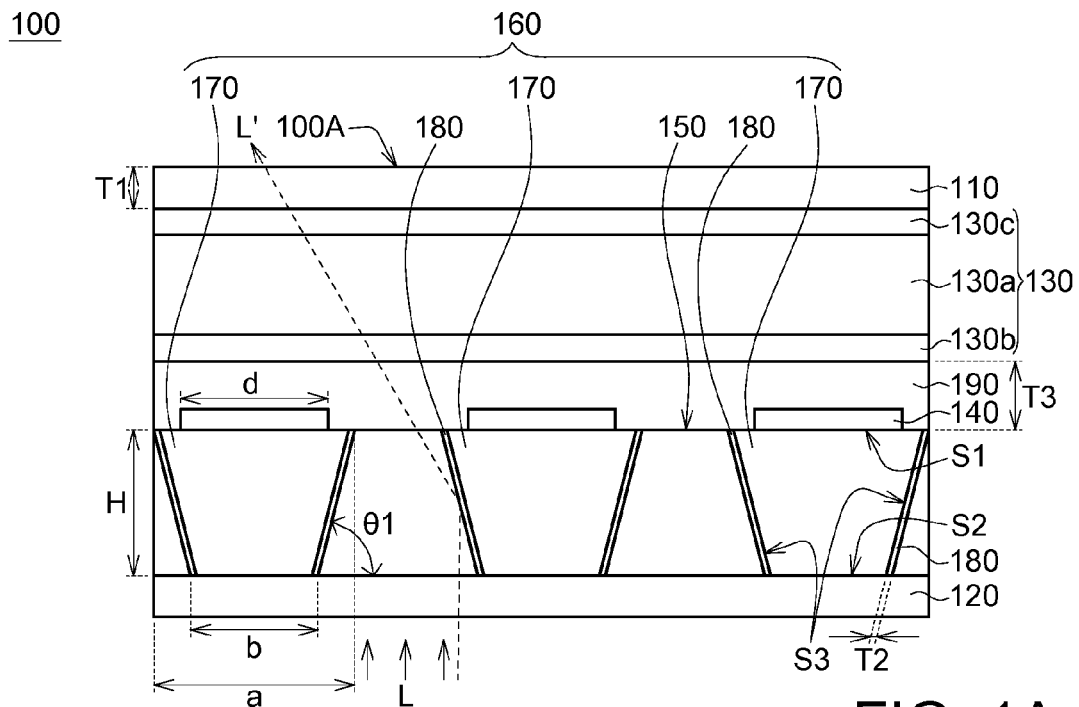
FIG. 1A is a cross-sectional view of a display device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present specification discloses different embodiments or exemplary examples for implementing different features of each embodiment of the present disclosure. The disclosure of the present specification describes exemplification of each component and its arrangement to simplify the description. However, these exemplifications are not for limiting the present disclosure. In addition, different exemplifications in the description of the present disclosure may use the same reference designations and/or terminologies. These repeated numeric designations and/or terminologies are simplified so as to provide clear descriptions of the disclosure, not for limiting any embodiments and/or the relationships of structures. Furthermore, in the present specification, the description that the first feature is formed on or over a second feature not only includes the embodiment in which the first feature and the second feature are in direct contact but also includes the embodiment in which an additional feature may be formed between the first feature and the second feature such that the first feature and the second feature may not be in direct contact.

FIG. 1A is a cross-sectional view of a display device 100 according to an embodiment of the present disclosure. In the present embodiment, the display device 100 may be realized by a transparent display device, and apart from the information displayed on the display surface 100A, the background light coming from the display device 100 and passing through the display device 100 may also be viewed on the display surface 100A of the display device 100. As indicated in FIG. 1A, the display device 100 includes a first substrate 110, a second substrate 120, a display element layer 130, a non-transparent structure 140, an optical guiding structure 160 and a reflective layer 180. The second substrate 120 is disposed opposite to the first substrate 110 adjacent to the display surface 100A of the display device 100. That is, the viewer may view the information displayed on the display device 100 from a side of the first substrate 110. The display element layer 130 is disposed between the first substrate 110 and the second substrate 120. The non-transparent structure 140 is disposed between the display element layer 130 and the second substrate 120, and defines at least one opening 150 of the display device 100. The optical guiding structure 160 is disposed on the non-transparent structure 140, and corresponds to at least one opening 150. The non-transparent structure 140 is located between the optical guiding structure 160 and the display element layer 130. The optical guiding structure 160 may further include a plurality of insulating structures 170. Each insulating structure 170 has a first surface S1 adjacent to the non-transparent structure 140 and side surfaces S3 connected to the first surface S1. The reflective layer 180 is disposed on the side surfaces S3. The ambient light L entering the display device 100 via a side of the second substrate 120 is reflected by the reflective layer 180 and exists via the opening 150. That is, the ambient light L between the insulating structures 170 is reflected by the reflective layer 180 and then further exists via the opening 150. The output light L' is illustrated in FIG. 1A. The ambient light L between the insulating structures 170 may be reflected by the reflective layer 180 once or more than once.

In some embodiments, the optical guiding structure 160 is disposed on the non-transparent structure 140 and corresponds to the opening 150. For example, the optical guiding structure 160 may surround the opening 150 in a closed manner. Or, the optical guiding structure 160 may merely surround partial peripheral of the opening 150. As indicated in FIG. 1A, the optical guiding structure 160 is disposed between the non-transparent structure 140 and the second substrate 120.

According to the embodiments of the present disclosure, the non-transparent structure 140 has a transmittance smaller than 50%. In some embodiments, the non-transparent structure 140 may be realized by a pixel circuit structure, such as a thin film transistor (TFT), a capacitor structure, or metal wires, a black matrix, or an ink contraction zone of an electrowetting display element.

According to the embodiments of the present disclosure, the ambient light L, which would otherwise be emitted towards the non-transparent structure 140, is reflected by reflective layer 180 of the display device 100 to exist via the opening 150. Thus, the ambient light L is effectively utilized, and the light utilization rate of the display device is greatly increased.

As indicated in the cross-sectional view of the display device 100 of FIG. 1A, each insulating structure 170 may further has a second surface S2 opposite to the first surface S1. The second surface S2 is connected to the first surface S1 via side surfaces S3. In an embodiment, the area of the first surface S1 is greater than the area of the second surface S2; the side surfaces S3 are connected to an edge of the first surface S1 and an edge of the second surface S2; each insulating structure 170 has a thickness H; the cross section of the first surface S1 has a cross-sectional length a; and the cross-section of the second surface S2 has a cross-sectional length b. For enabling the ambient light L to have a higher transmittance, the angle $\theta 1$ formed between one of the side surfaces S3 of each insulating structure 170 and an extension line L1 of the second surface S2 may be greater than or equal to 50°, that is, $H/((a-b)/2)$ is greater than or equal to tan 50°. In an embodiment, when the cross-sectional length a of the first surface S1 is equal to the cross-sectional length d of the non-transparent structure 140 (not illustrated in FIG. 1A), the ambient light L will have a better transmittance. In other embodiments, the cross-sectional length a of the first surface S1 may be slightly smaller than the cross-sectional length d of the non-transparent structure 140.

Refer to FIG. 1A. The display device 100 may further include a planarization layer 190 interposed between the non-transparent structure 140 and the display element layer 130.

Figure 1B:
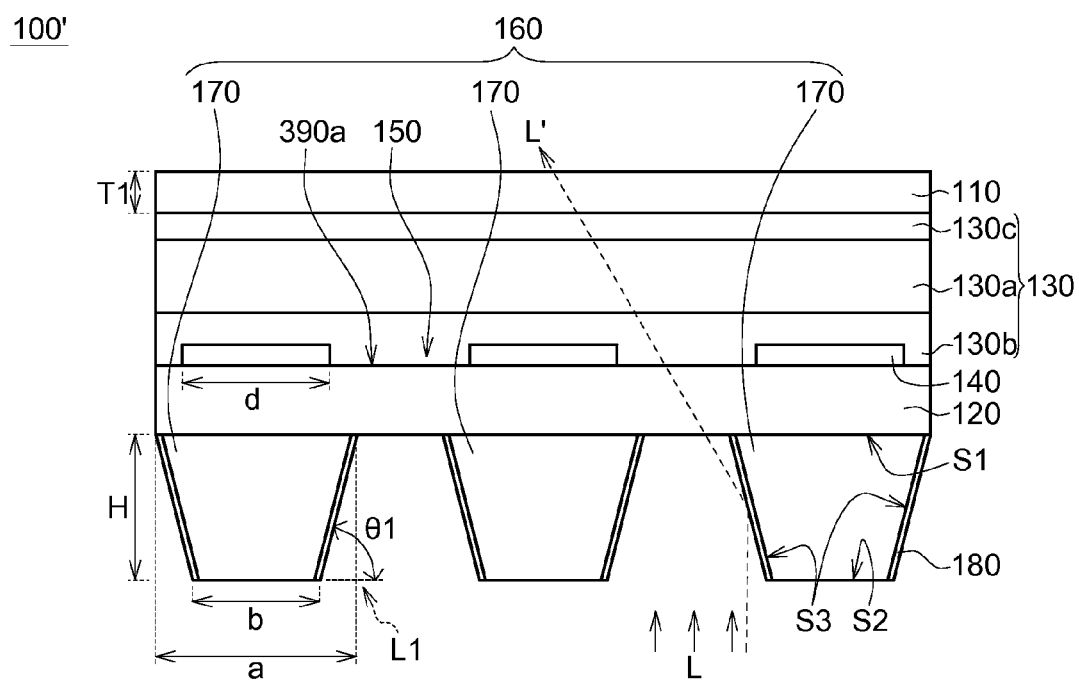
FIG. 1B is a cross-sectional view of a display device according to another embodiment of the present disclosure.

FIG. 1B is a cross-sectional view of a display device 100' according to another embodiment of the present disclosure.

Components of FIG. 1B common to that of FIG. 1A retain the same numeric designations, and related descriptions already disclosed above are not repeated here to simplify the description. In the present embodiment, the position of the second substrate 120 in the display device 100' may be selectively changed, and the display device 100' does not include the planarization layer 190 of FIG. 1A. As indicated in FIG. 1B, the second substrate 120 is located between the non-transparent structures 140 and the insulating structures 170.

In the embodiments as indicated in FIGS. 1A-1B, the display element layer 130 includes a display medium layer 130a, a first electrode 130b and a second electrode 130c, and the display medium layer 130a is located between the first electrode 130b and the second electrode 130c. In an embodiment, the display medium layer 130a may be realized by at least one of LCD display medium, OLED display medium or electrowetting display medium, but the disclosure is not limited thereto. The display element layer 130 may be realized by an active matrix display element or a passive matrix display element, but the disclosure is not limited thereto. In an embodiment, if the display element layer 130 is realized by an organic light emitting diode (OLED) display element, then the display medium layer 130a, apart from the first electrode 130b and the second electrode 130c, may further include a hole injection layer, a hole transfer layer, a light-emitting layer, an electron transfer layer and an electron injection layer.

Figure 2:
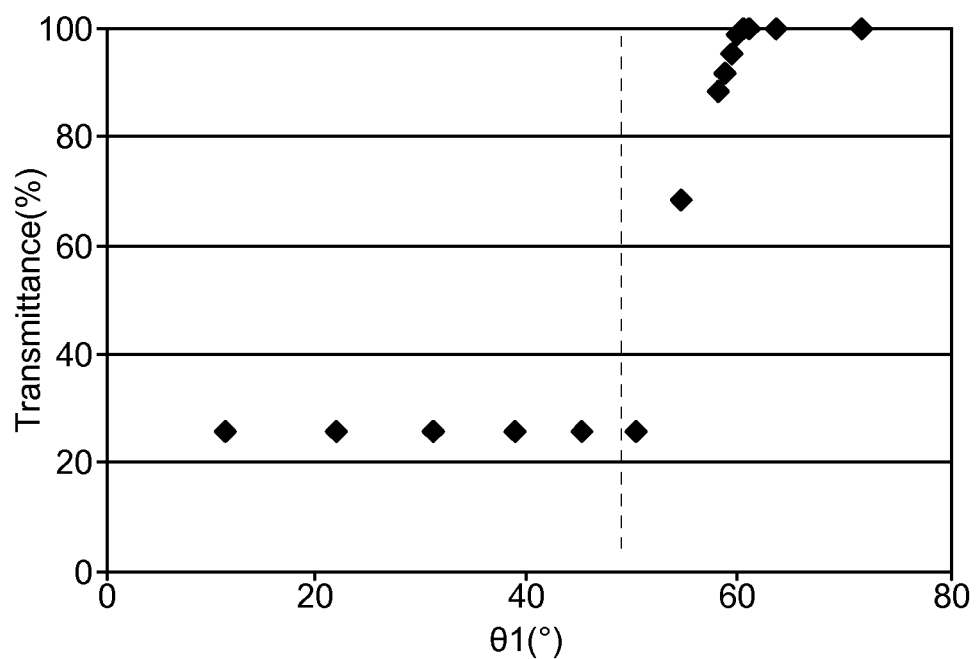
FIG. 2 is a simulated relationship diagram of an angle formed between a second surface and one of the side surfaces of an insulating structure vs the transmittance of an ambient light according to an embodiment of the present disclosure.

FIG. 2 is a simulated relationship diagram of an angle θ1 formed between an extension line L1 of a second surface S2 and one of the side surfaces S3 of an insulating structure 170 and the transmittance of an ambient light L according to an embodiment of the present disclosure. As illustrated in FIG. 2, when the angle θ1 is greater than or equal to 50°, the transmittance of the ambient light L is significantly increased.

Figure 3A:
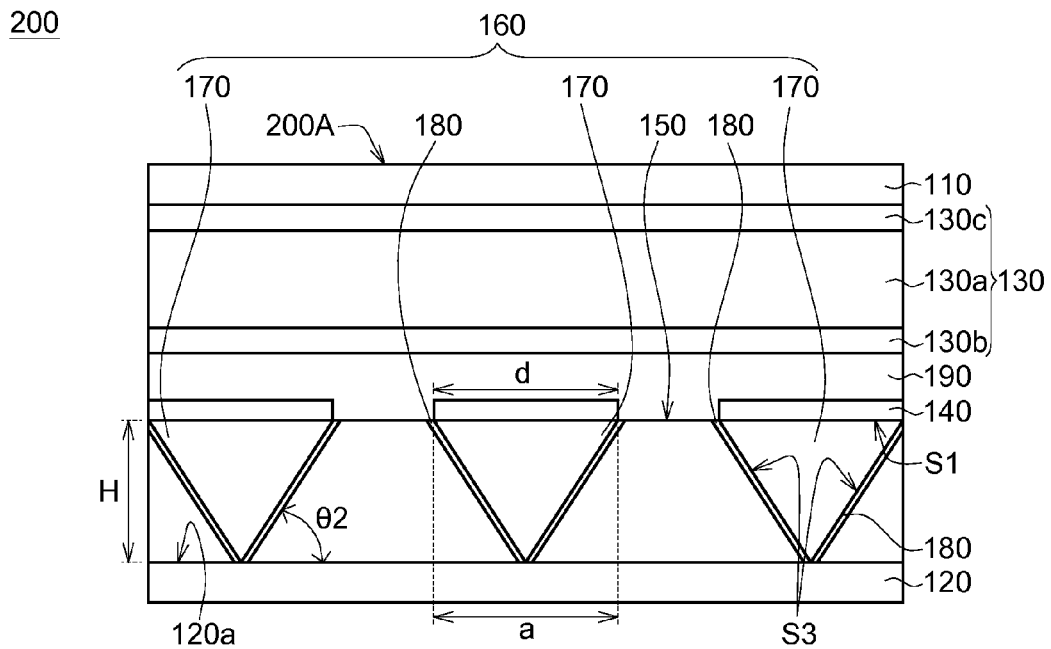
FIG. 3A is a cross-sectional view of a display device according to an alternate embodiment of the present disclosure.

Referring to FIG. 3A, a cross-sectional view of a display device according to an alternate embodiment of the present disclosure is shown. In the present embodiment, the display device 200 can also be realized by a transparent display device, and apart from the information displayed on the display surface 200A of the display device 200, the background light coming from the back of the display device 200 and passing through the display device 200 may also be viewed on the display surface 200A of the display device 200. The components of FIG. 3A common to those of FIGS. 1A-1B retain the same numeric designations, and related descriptions already disclosed above are not repeated here to simplify the description. The structure of the display device 200 of FIG. 3A is similar to that of the display device 100 of FIG. 1A. The difference lies in that in the display device 200 of FIG. 3A, side surfaces S3 of one insulating structure 170 are connected to each other, that is, the cross-sectional length b of the second surface S2 is substantially equal to 0 (the second surface S2 is omitted), and the ambient light L entering the display device via the side of the second substrate 120 and completely reaching the reflective layer 180 is reflected by the reflective layer 180 and further exists via the opening 150. That is, the ambient light L between the insulating structures 170 is reflected by the reflective layer 180 and further exists via the opening 150. The ambient light L between the insulating structures 170 may be reflected by the reflective layer 180 once or more than once. Under such circumstance, the ambient light L may have a better transmittance.

In the embodiment as indicated in FIG. 3A, each insulating structure 170 has a thickness H, the cross-section of the first surface S1 has a cross-sectional length a, and the insulating structure 170 may be in contact with a surface 120a of the second substrate 120. For enabling the ambient light L to have a higher transmittance, the angle θ2 formed between one of the side surfaces S3 of the insulating structures 170 and the surface 120a of the second substrate 120 may be greater than or equal to 50°, that is, H/(a/2) is greater than or equal to 50°.

Figure 3B:
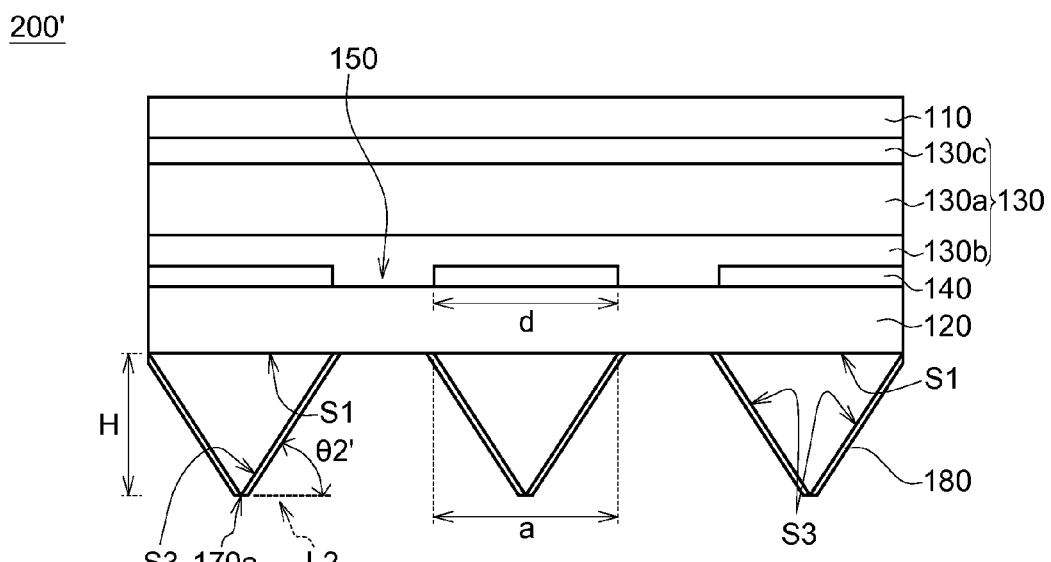
FIG. 3B is a cross-sectional view of a display device according to another alternate embodiment of the present disclosure.

FIG. 3B is a cross-sectional view of a display device according to an alternate embodiment of the present disclosure. The components of FIG. 3A common to those of the above drawings retain the same numeric designations, and related descriptions already disclosed above are not repeated here to simplify the description. In the present embodiment, the position of the second substrate 120 in the display device 200' may be selectively changed, and the display device 200' does not include the planarization layer 190 of FIG. 3A. As indicated in FIG. 3B, the second substrate 120 is located between the non-transparent structures 140 and the insulating structures 170. In the present embodiment as indicated in FIG. 3B, an extension line L2 is extended from the apex 170a of the insulating structure 170 in a direction parallel to the first surface S1 of the insulating structure 170; the angle θ2' formed between one of the side surfaces S3 of the insulating structure 170 and the extension line L2 may be greater than or equal to 50°, that is, H/(a/2) is greater than or equal to tan 50°.

Figure 4A:
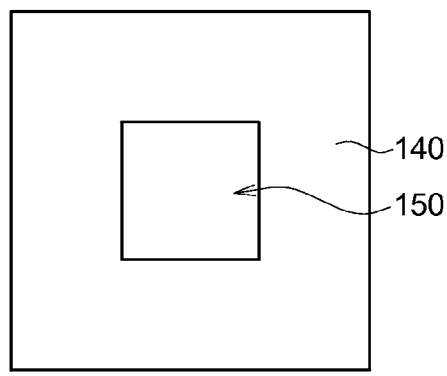
FIG. 4A is a partial top view of an opening and a non-transparent structure of the display device according to an embodiment of the present disclosure.
Figure 4B:
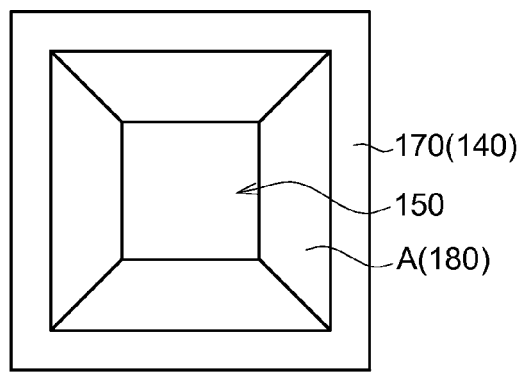
FIG. 4B is a partial top view of an opening and a non-transparent structure of the display device of FIG. 1A.
Figure 4C:
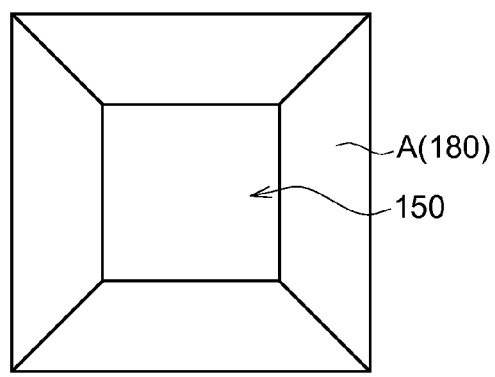
FIG. 4C is a partial top view of an opening and a non-transparent structure of the display device of FIG. 3A.

FIG. 4A is a partial top view of an opening and a non-transparent structure of the display device according to an embodiment of the present disclosure. FIG. 4A illustrates one single opening 150 and its corresponding non-transparent structure 140. According to the embodiments of the present disclosure, the display device may have a plurality of repetitively arranged openings 150 and corresponding non-transparent structures 140, and the shape of each opening 150 may be circle, ellipse, rectangle, diamond, hexagonal, polygonal or irregular shape, but the disclosure is not limited thereto. In the present embodiment, the opening 150 is located at the center of the non-transparent structure 140 and is symmetrically arranged, but relative positions between the opening 150 and the non-transparent structure 140 are determined according to the component design of the display device and are not limited to the exemplification of FIG. 4A. Refer to FIG. 1A, FIG. 4A and FIG. 4B at the same time. In an embodiment, FIG. 4A and FIG. 4B are partial top views of relative positions of the opening 150 and the non-transparent structure 140 of the display device 100 of FIG. 1A. FIG. 4A is a top view viewed from a side of the first substrate 110. FIG. 4B A is a top view viewed from a side of the second substrate 120. Apart from the opening 150 and the non-transparent structure 140, region A represents the region in which the ambient light L which would otherwise be shielded by the non-transparent structure 140 but is guided to the opening 150 by the optical guiding structure 160, that is, the reflective layer 180 disposed on the insulating structure 170. FIG. 4C is a partial top view of an opening and a non-transparent structure of the display device 200 of FIG. 3A. FIG. 4C is a top view viewed from a side of the second substrate 120. Region A represents the region in which the ambient light L which would otherwise be shielded by the non-transparent structure 140 but is guided to the opening 150 by the optical guiding structure 160, that is, the reflective layer 180 disposed on the insulating structure 170.

Figure 5:
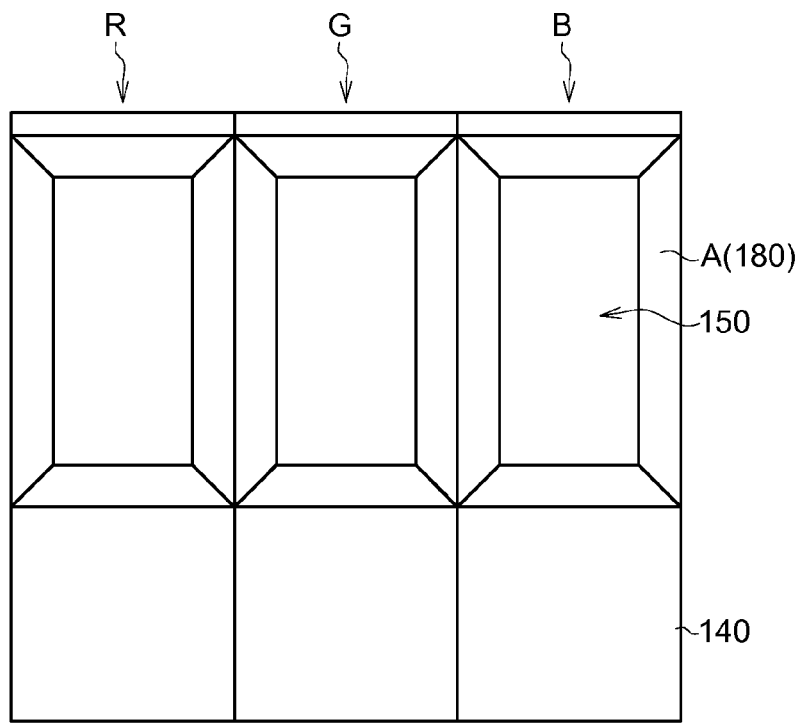
FIG. 5 is a top view of openings and non-transparent structures of the display device according to an alternate embodiment of the present disclosure.

FIG. 5 is a top view of three openings and three corresponding non-transparent structures of the display device according to an alternate embodiment of the present disclosure. According to the embodiments of the present disclosure, the display device may have more than three repetitively arranged openings 150 and non-transparent structures 140, and the shape of each opening 150 may be circle, ellipse, rectangle, diamond, hexagonal, polygonal or irregular shape, but the disclosure is not limited thereto. In the present embodiment, each opening 150 is not located at the center of the non-transparent structure 140. Region A represents the region in which the ambient light L which would otherwise be shielded by the non-transparent structure 140 but is guided to the opening 150 by the optical guiding structure 160, that is, the reflective layer 180 disposed on the insulating structure 170. In an embodiment, the structure as indicated in FIG. 5 may include three sub-pixels, such as sub-pixels R, G and B. Each sub-pixel has an opening 150, and part of the non-transparent structure 140 under the opening 150 may be the light-emitting structure of each sub-pixel.

Figure 6A:
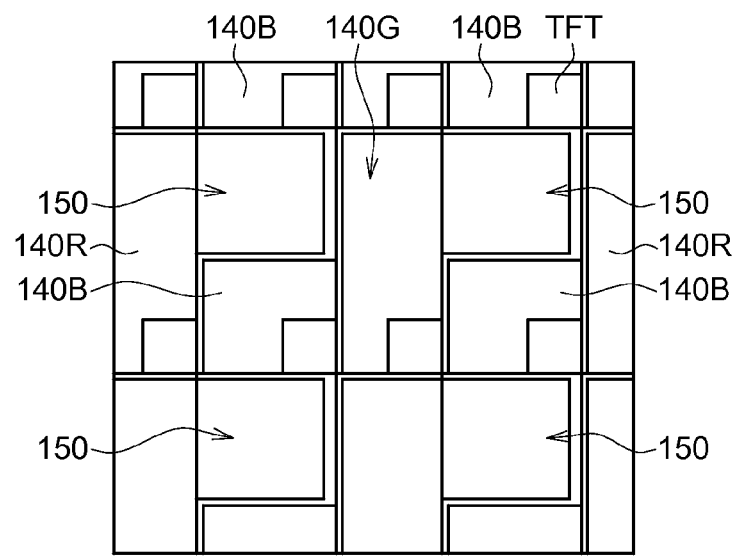
FIG. 6A and FIG. 6B are top views of openings and non-transparent structures of the display device according to another embodiment of the present disclosure.
Figure 6B:
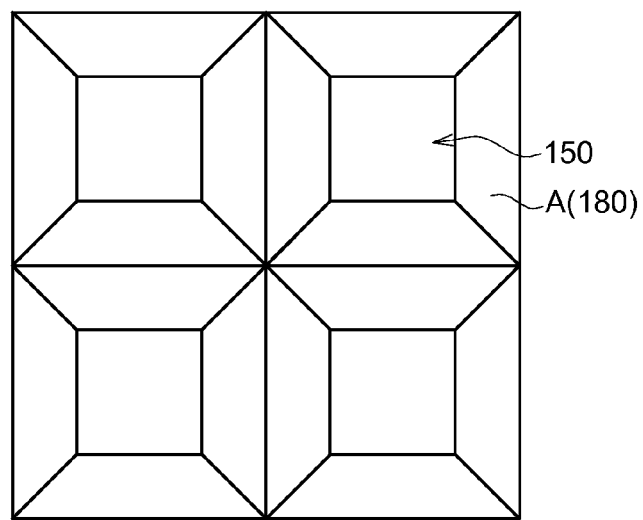

FIG. 6A and FIG. 6B are top views of four openings 150 and four corresponding non-transparent structures 140 of the display device according to another embodiment of the present disclosure. FIG. 6A is a top view viewed from a side of the first substrate 110. FIG. 6B is a top view viewed from a side of the second substrate 120. In the present embodiment, each opening 150 is located at the center of the non-transparent structure 140, and region A represents the region in which the ambient light L which would otherwise be shielded by the non-transparent structure 140 but is guided to the opening 150 by the optical guiding structure 160, that is, the reflective layer 180 disposed on the insulating structure 170. In an embodiment, the structure as indicated in FIG. 6A-6B may include four squared sub-pixels, each having an opening 150, and adjacent sub-pixels may share the same light emitting structure. For example, two adjacent sub-pixels may share the light emitting structure 140G. The non-transparent structure 140 may be constructed by a thin film transistor TFT and the light emitting structures 140R, 140G and 140B of each sub-pixel.

Figure 7:
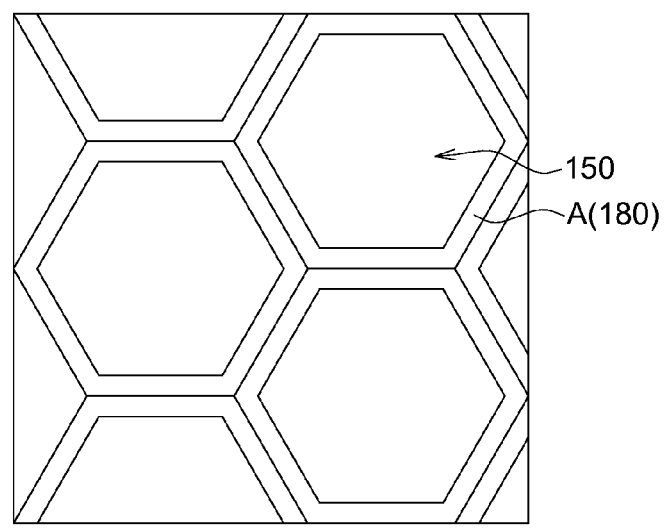
FIG. 7 is a top view of openings and non-transparent structures of the display device according to another alternate embodiment of the present disclosure.

FIG. 7 is a top view of openings 150 and non-transparent structures 140 of the display device according to another alternate embodiment of the present disclosure. FIG. 7 is a top view viewed from a side of the second substrate 120. In the present embodiment, the shape of each opening 150 may be a hexagon. Each opening 150 is located at the center of the non-transparent structure 140, and region A represents the region in which the ambient light L which would otherwise be shielded by the non-transparent structure 140 but is guided to the opening 150 by the optical guiding structure 160, that is, the reflective layer 180 disposed on the insulating structure 170.

Figure 8:
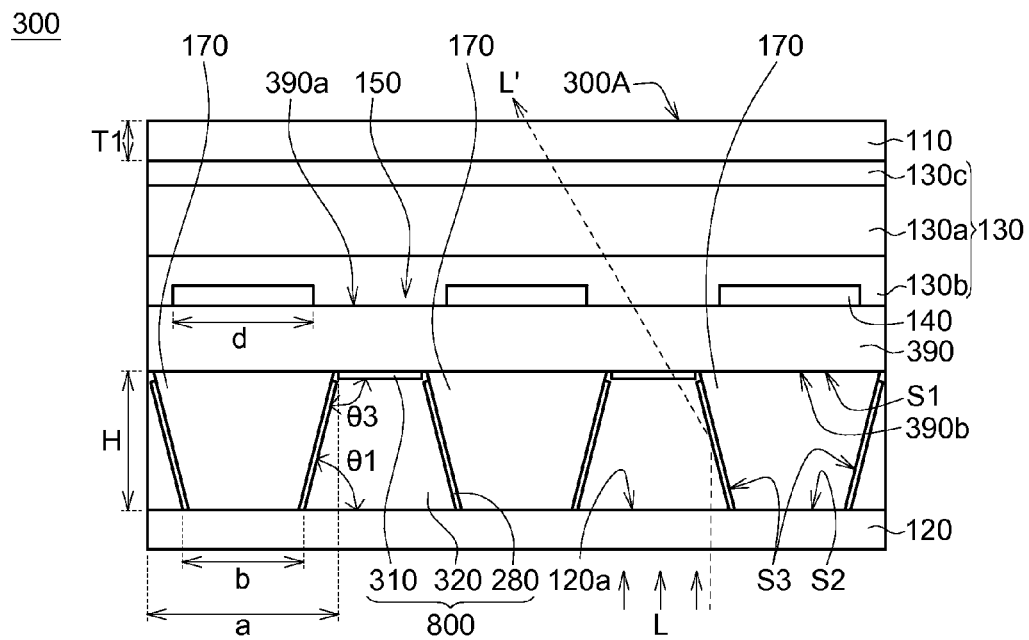
FIG. 8 is a cross-sectional view of a display device according to a still alternate embodiment of the present disclosure.

FIG. 8 is a cross-sectional view of a display device 300 according to an alternate embodiment of the present disclosure. In the present embodiment, the components common to those in the above embodiments retain the same numeric designations, and related descriptions already disclosed above are not repeated here to simplify the description.

In the present embodiment as indicated in FIG. 8, the display device 300 may be realized by a transparent display device. That is, apart from the message displayed on the display surface 300A of the display device 300, the background light coming from the back of the display device 300 and passing through the display device 300 may also be viewed on the display surface 300A of the display device 300. As indicated in FIG. 8, the display device 300 includes the first substrate 110, the second substrate 120, the display element layer 130, the non-transparent structure 140 and a plurality of insulating structures 170. The second substrate 120 is disposed opposite to the first substrate, wherein the first substrate 110 is located adjacent to a display surface 300A of the display device 300; that is, an observer views the display information of the display device 300 from the side of the first substrate 110. The display element layer 130 is disposed between the first substrate 110 and the second substrate 120. The non-transparent structure 140 is disposed between the display element layer 130 and the second substrate 120 and defines at least one opening 150 of the display device 300. The insulating structures 170 are disposed on the non-transparent structure 140, wherein the non-transparent structure 140 is located between the insulating structures 170 and the display element layer 130, and each of the insulating structures 170 has a first surface S1 adjacent to the non-transparent structure 140 and side surfaces S3 connected to the first surface S1.

In the present embodiment, the display device 300 may further include at least one electrochromic block 800 located between the non-transparent structure 140 and the second substrate 120. The ambient light L entering the display device 300 from the side of the second substrate 120 and passing through the electrochromic block 800 exists via the opening 150.

In an embodiment, as indicated in FIG. 8, the display device 300 may further include a third substrate 390. The display element layer 130 and the non-transparent structure 140 are formed on a surface 390a of the third substrate 390. The insulating structures 170 are formed on a surface 390b of the third substrate 390. The surface 390b is opposite to the surface 390a. In an alternate embodiment, the display device 300 may optionally include a planarization layer (not illustrated in FIG. 8), but does not include the third substrate 390. The planarization layer, as indicated in FIG. 1A, is located between the non-transparent structure 140 and the display element layer 130.

In the present embodiment, the cross-sectional length a of the first surface S1 is larger than the cross-sectional length d of the non-transparent structure 140. Furthermore, in an embodiment, the cross-sectional length a of the first surface S1 may be such as equal to the cross-sectional length d of the non-transparent structure 140 (not illustrated in FIG. 8).

In the present embodiment as indicated in FIG. 8, the electrochromic block 800 may include a first transparent electrode 310, a conductive layer 280 and an electrochromic medium 320. The first transparent electrode 310 is disposed corresponding to the at least one opening 150, such as covering the opening 150. The conductive layer 280 is disposed on the side surfaces S3 of the insulating structures 170 and is used as an electrode. The electrochromic medium 320 is adjacent to the first transparent electrode 310 and the conductive layer 280. In an embodiment, the conductive layer 280 and the first transparent electrode 310 are electrically insulated from each other. In the embodiment as indicated in FIG. 8, the angle θ3 formed between the first transparent electrode 310 and the conductive layer 280 is, for example, smaller than 180°. As indicated in FIG. 8, in the embodiment, the first transparent electrode 310 is located such as between the display element layer 130 and the electrochromic medium 320. In the embodiment, the conductive layer 280 is such as a metal layer which is conductive and may be used as an electrode material. The first transparent electrode 310 is such as indium tin oxide (ITO), silver nanowire, carbon nanotube, graphene, conductive polymer, or any combinations thereof. In an embodiment, the conductive layer 280 and the first transparent electrode 310 may be formed of such as the same material.

In an embodiment, the conductive layer 280 may be reflective as well, such as a reflective metal layer. As such, the ambient light L entering the display device via a side of the second substrate 120 may be reflected by the reflective conductive layer 280 and exists via the opening 150. That is, the ambient light L between the insulating structures 170 is reflected by the reflective conductive layer 280 and then further exists via the opening 150. The output light L' is illustrated in FIG. 8. The ambient light L between the insulating structures 170 may be reflected by the reflective conductive layer 280 once or more than once.

In an embodiment, the electrochromic medium 320 may be realized by a mixture including an electrochromic material and an electrolyte, and the mixture is received in a closed cavity formed by such as the sidewalls of the insulating structure 170, the surface 120a of the second substrate 120 and the first transparent electrode 310. When not energized, the color of the mixture material is transparent; when energized, oxidation/reduction of the electrochromic material of the mixture occurs on the surface of the first transparent electrode 310, the color of the mixture material changes, for example, the color may change to black. Therefore, the background light image is shielded, and the display surface 300A of the display device 300 may only display predetermined images, and the contrast of the display image of the transparent display device is increased.

As indicated in FIG. 8, the first transparent electrode 310 covers the opening 150 and is parallel to the second substrate 120, and the conductive layer 280 is located on the sidewalls of the insulating structures 170. In contrast to the design which the two electrodes are disposed on the same plane, according to the embodiments of the present disclosure, the angle formed between the first transparent electrode 310 and the conductive layer 280 is smaller than 180°, hence shortening the distance of the current trend and increasing the response rate; that is, the speed of color change of the electrochromic block is increased. In an embodiment, the angle formed between the first transparent electrode 310 and the conductive layer 280 may be 50-130°. In another embodiment, the angle formed between the first transparent electrode 310 and the conductive layer 280 may be 90-120°.

In an embodiment, the electrochromic material may include at least one of transition metal oxide, Prussian blue, viologen, conducting polymer, metallopolymer, or metal phthalocyanines; the electrolyte may include at least one of lithium-ion solution, hydrogen-ion solution, sodium-ion solution, potassium-ion solution, propylene carbonate, ethylene carbonate, and dimethyl carbonate.

Figure 9:
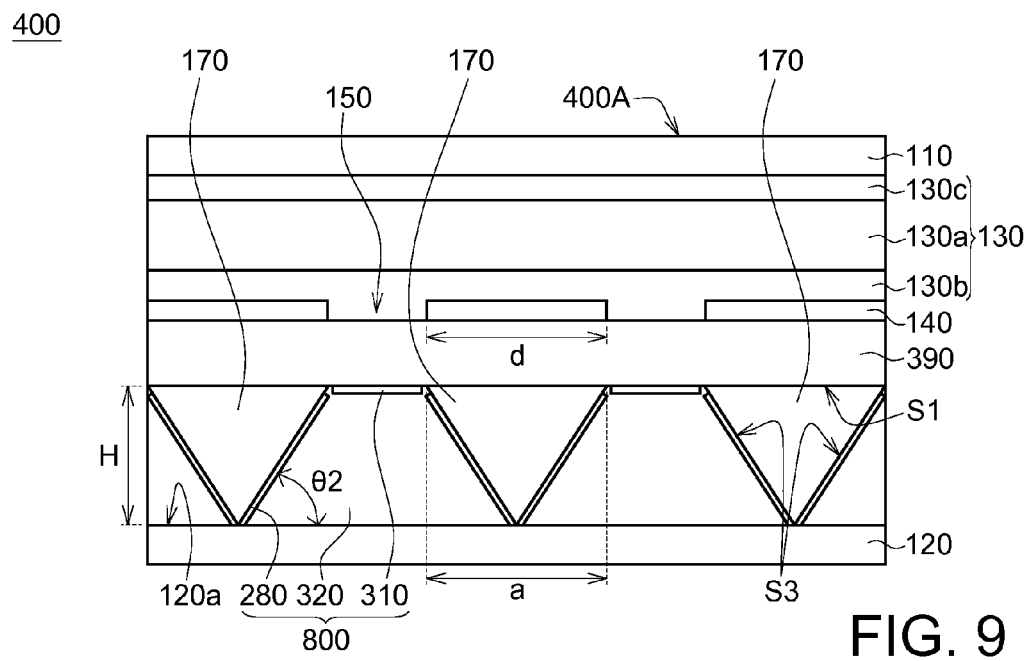
FIG. 9 is a cross-sectional view of a display device according to a still another embodiment of the present disclosure.

FIG. 9 is a cross-sectional view of a display device 400 according to a still another embodiment of the present disclosure. In the present embodiment, the components common to those in the above embodiments retain the same numeric designations, and related descriptions already disclosed above are not repeated here to simplify the description.

In the present embodiment as indicated in FIG. 9, the display device 400 may be realized by a transparent display device, and apart from the message displayed on the display surface 400A of the display device 400, the background light coming from the back of the display device 400 and passing through the display device 400 may also be viewed on the display surface 400A of the display device 400. The display device 400 of the present embodiment is different from the display device 300 of the previous embodiment mainly in that the side surfaces S3 of one insulating structure 170 are connected to each other. As indicated in FIG. 9, the insulating structure 170 may be in contact with the surface 120a of the second substrate 120, such that an independent closed cavity of the electrochromic medium 320 is formed between the insulating structures 170. Via the arrangement of the electrochromic block 800, the background light image is shielded, and the display surface 400A of the display device 400 may only display predetermined images, and the contrast of the display image of the transparent display device is increased. The structural design of the side surfaces S3 being connected to each other in the present embodiment may be applied in other embodiments of the present disclosure, and the various designs of the electrochromic block in other embodiments may be applied in different structures of different embodiments. The disclosure is not limited to any single type in each of the embodiments.

Figure 10:
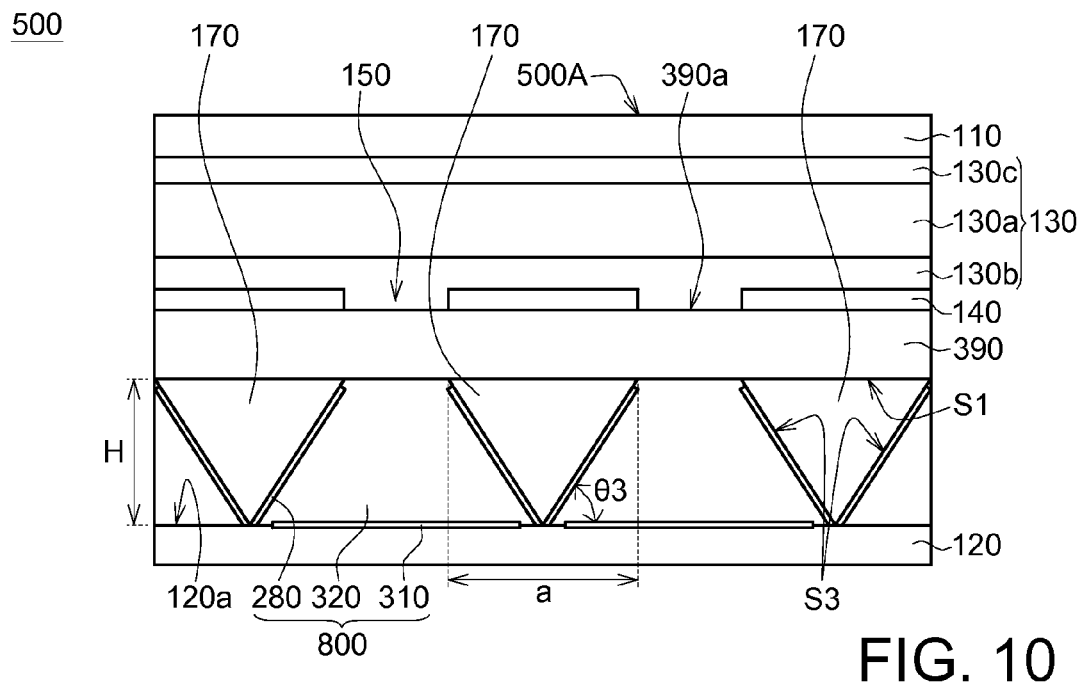
FIG. 10 is a cross-sectional view of a display device according to a still another alternate embodiment of the present disclosure.

FIG. 10 is a cross-sectional view of a display device 500 according to a still another alternate embodiment of the present disclosure. In the present embodiment, the components common to those in the above embodiments retain the same numeric designations, and related descriptions already disclosed above are not repeated here to simplify the description.

In the present embodiment as indicated in FIG. 10, the display device 500 may be realized by a transparent display device. That is, apart from the message displayed on the display surface 500A of the display device 500, the background light coming from the back of the display device 500 and passing through the display device 500 may also be viewed on the display surface 500A of the display device 500. The display device 500 of the present embodiment is different from the display devices of the previous embodiments mainly in the location where the first transparent electrode 310 is disposed. As indicated in FIG. 10, the first transparent electrode 310 is located between such as the electrochromic medium 320 and the second substrate 120. Via the arrangement of the electrochromic block 800, the background light image is shielded, and the display surface 500A of the display device 500 may only display predetermined images, and the contrast of the display image of the transparent display device is increased.

Figure 11:
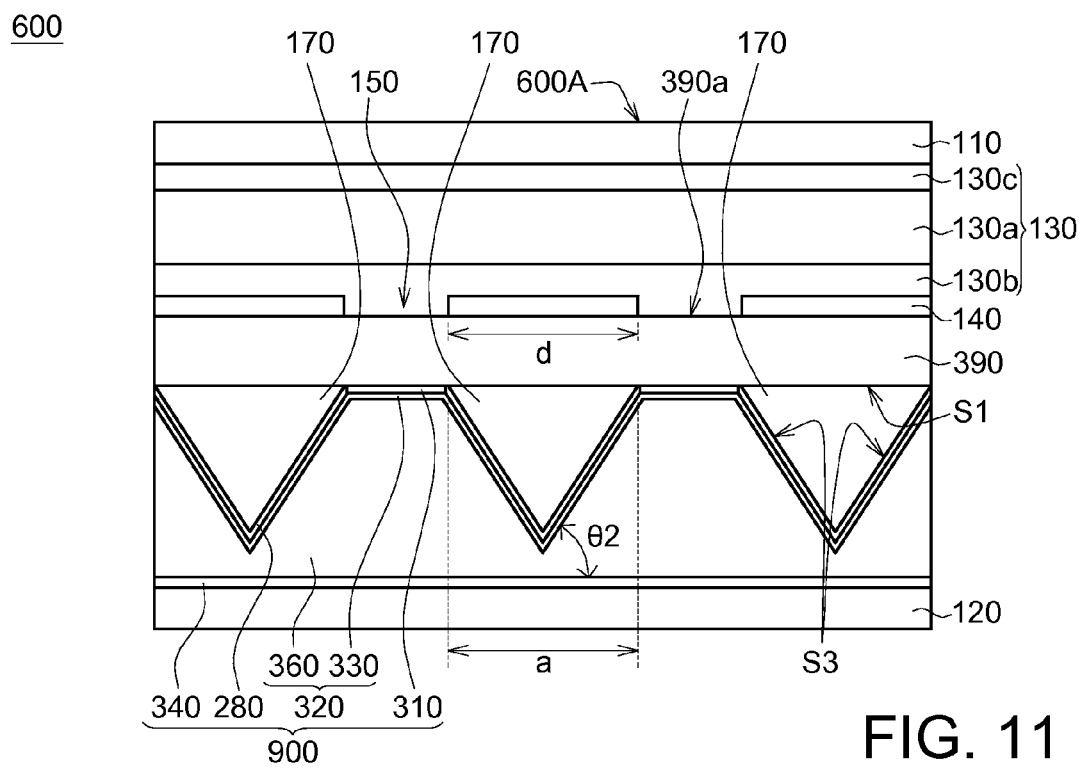
FIG. 11 is a cross-sectional view of a display device according to a further embodiment of the present disclosure.

FIG. 11 is a cross-sectional view of a display device 600 according to a further embodiment of the present disclosure. In the present embodiment, the components common to those in the above embodiments retain the same numeric designations, and related descriptions already disclosed above are not repeated here to simplify the description. In the present embodiment as indicated in FIG. 11, the display device 600 may be realized by a transparent display device, and apart from the message displayed on the display surface 600A of the display device 600, the background light coming from the back of the display device 600 and passing through the display device 600 may also be viewed on the display surface 500A of the display device 600. In the present embodiment, the display device 600 may further include an electrochromic block 900 disposed between the non-transparent structure 140 and the second substrate 120.

As indicated in FIG. 11, the display device 600 includes the first substrate 110, the second substrate 120, the display element layer 130, the non-transparent structure 140, and the insulating structures 170. In an embodiment, the display device 600 may further include the third substrate 390. The display element layer 130 and the non-transparent structure 140 are formed on the surface 390a of the third substrate 390, and the insulating structures 170 are formed on the surface 390b of the third substrate 390, wherein the surface 390a is opposite to the surface 390b. In an alternate embodiment, the display device 600 may optionally include a planarization layer (not illustrated in FIG. 11) but does not include the third substrate 390. The planarization layer, as indicated in FIG. 1A, is located between the non-transparent structure 140 and the display element layer 130.

In the present embodiment, the electrochromic block 900 may include a first transparent electrode 310, the conductive layer 280, a second transparent electrode 340, and the electrochromic medium 320. The second transparent electrode 340 is disposed on the second substrate 120, and the electrochromic medium 320 may include a first electrochromic material layer 330 and an electrolyte layer 360. As indicated in FIG. 11, the conductive layer 280 is connected to the first transparent electrode 310. The first transparent electrode 310 covers at least one opening 150. The first electrochromic material layer 330 is disposed on the first transparent electrode 310 and the conductive layer 280. The electrolyte layer 360 is located between the first electrochromic material layer 330 and the second transparent electrode 340.

In the present embodiment, the first transparent electrode 310 is electrically connected to the conductive layer 280 which is used as an electrode. As indicated in FIG. 11, the first transparent electrode 310 and the second transparent electrode 340 are electrically insulated from each other. In an embodiment, after the device is energized, a chemical reaction of the first electrochromic material layer 330 occurs on the first transparent electrode 310 and the color of the first electrochromic material layer 330 is changed. For example, the color of the electrochromic material layer changes to black. Therefore, the background light image is shielded, and the display surface 600A of the display device 600 may only display predetermined images.

In an embodiment, the first electrochromic material layer 330 may be the same as the above-mentioned electrochromic material, for example, the first electrochromic material layer 330 may include at least one of transition metal oxide, Prussian blue, viologen, conducting polymer, metallopolymer, or metal phthalocyanines. In an embodiment, the electrolyte layer 360 may include at least one of lithium-ion solution, hydrogen-ion solution, sodium-ion solution, potassium-ion solution, or carbonate compound solution. The carbonate compound solution may be formed of propylene carbonate, ethylene carbonate, dimethyl carbonate or a combination thereof.

Figure 12:
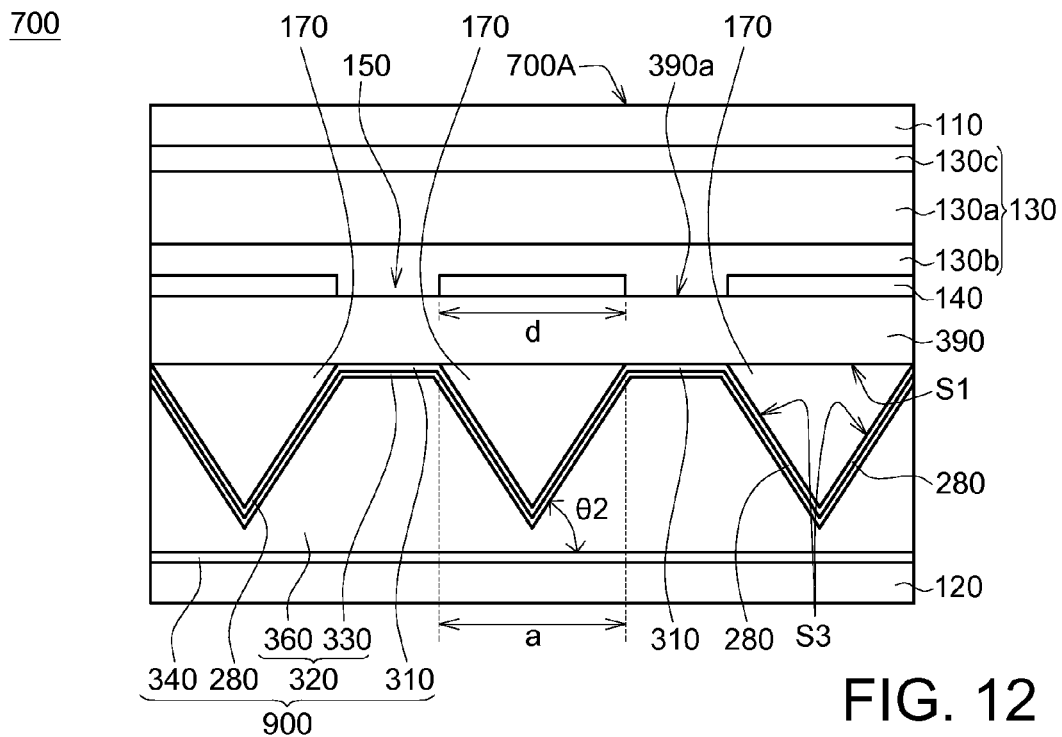
FIG. 12 is a cross-sectional view of a display device according to a further another embodiment of the present disclosure.

FIG. 12 is a cross-sectional view of a display device 700 according to a further another embodiment of the present disclosure. In the present embodiment, the components common to those in the above embodiments retain the same numeric designations, and related descriptions already disclosed above are not repeated here to simplify the description.

In the present embodiment as indicated in FIG. 12, the display device 700 may be realized by a transparent display device. That is, apart from the message displayed on the display surface 700A of the display device 700, the background light coming from the back of the display device 700 and passing through the display device 700 may also be viewed on the display surface 700A of the display device 700. The display device 700 of the present embodiment is different from the display device 600 of the previous embodiments mainly in that the conductive layer 280 is transparent. As indicated in FIG. 12, the conductive layer 280 is connected to the first transparent electrode 310 forming a plane transparent electrode layer. In other words, the conductive layer 280 and the first transparent electrode 310 are in fact an integrated transparent electrode layer formed by the same manufacturing process, such as an ITO layer, but not limited thereto. In the present embodiment, the conductive layer 280 and the first transparent electrode 310 are formed of such as the same material. Via the arrangement of the electrochromic block 900, the background light image is shielded, and the display surface 700A of the display device 700 may only display predetermined images, and the contrast of the display image of the transparent display device is increased.

Figure 13:
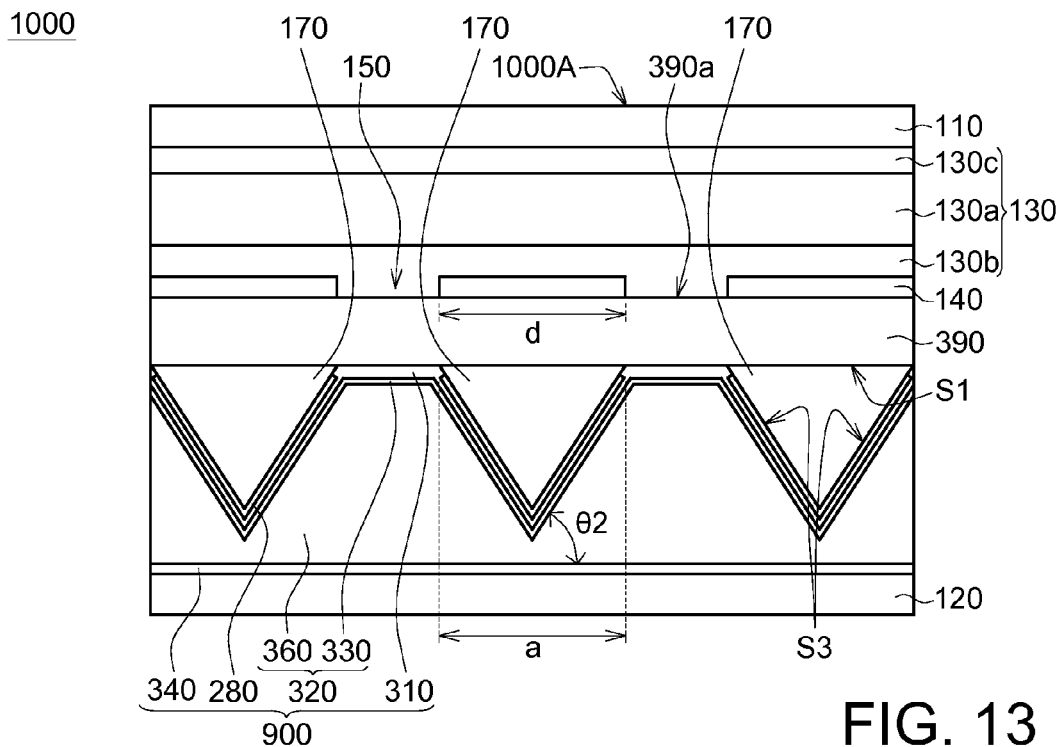
FIG. 13 is a cross-sectional view of a display device according to a further alternate embodiment of the present disclosure.

FIG. 13 is a cross-sectional view of a display device 1000 according to a further alternate embodiment of the present disclosure. In the present embodiment, the components common to those in the above embodiments retain the same numeric designations, and related descriptions already disclosed above are not repeated here to simplify the description.

In the present embodiment as indicated in FIG. 13, the display device 1000 may be realized by a transparent display device. That is, apart from the message displayed on the display surface 1000A of the display device 1000, the background light coming from the back of the display device 1000 and passing through the display device 1000 may also be viewed on the display surface 1000A of the display device 1000. The display device 1000 of the present embodiment is different from the display device 700 of the previous embodiments mainly in that the first transparent electrode 310 is further disposed on the conductive layer 280. As indicated in FIG. 13, the first transparent electrode 310 is a plane transparent electrode layer covering the opening 150 and the conductive layer 280. As such, the manufacturing process of patterning the first transparent electrode may be omitted, providing advantages of simplifying the manufacturing process. Moreover, the first electrochromic material layer 330 is formed on the first transparent electrode 310, and a portion of the first transparent electrode 310 is formed on the conductive layer 280; in the embodiment, the conductive layer 280 is such as a conductive metal layer, and a large area of the conductive layer 280 is in direct contact with the first transparent electrode 310, thereby achieving the effects of lowering the resistance of the electrode structure. Via the arrangement of the electrochromic block 900, the background light image is shielded, and the display surface 1000A of the display device 1000 may only display predetermined images, and the contrast of the display image of the transparent display device is increased.

Figure 14:
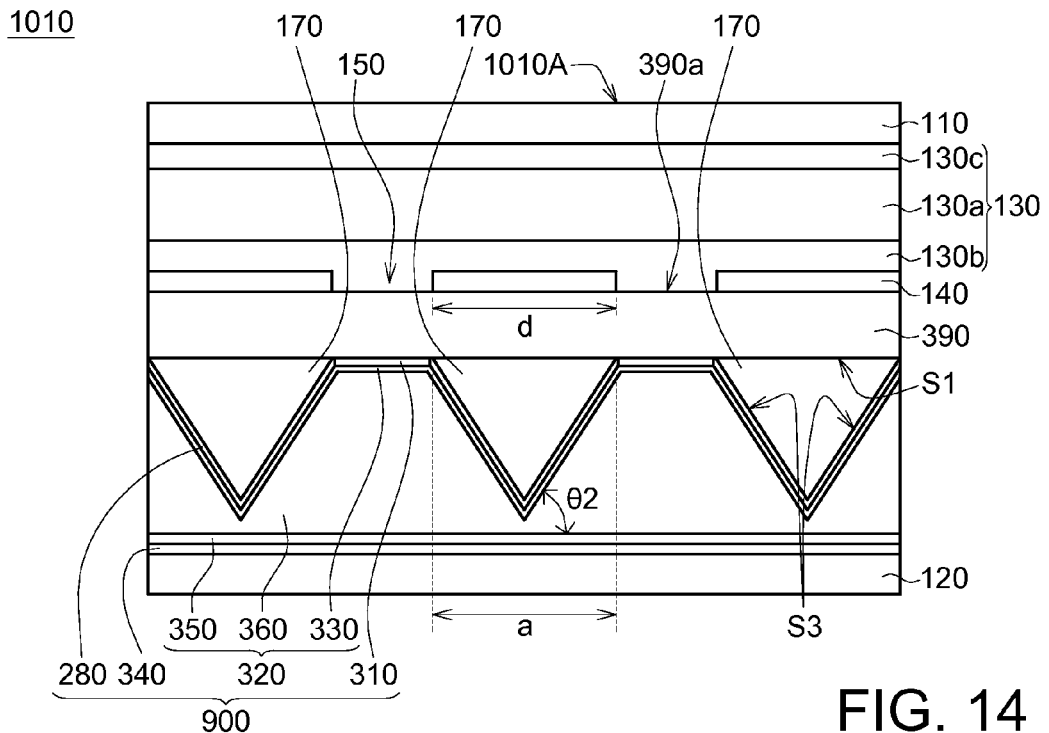
FIG. 14 is a cross-sectional view of a display device according to a still further embodiment of the present disclosure.

FIG. 14 is a cross-sectional view of a display device 1010 according to a still further embodiment of the present disclosure. In the present embodiment, the components common to those in the above embodiments retain the same numeric designations, and related descriptions already disclosed above are not repeated here to simplify the description.

In the present embodiment as indicated in FIG. 14, the display device 1010 may be realized by a transparent display device. That is, apart from the message displayed on the display surface 1010A of the display device 1010, the background light coming from the back of the display device 1010 and passing through the display device 1010 may also be viewed on the display surface 1010A of the display device 1010. The display device 1010 of the present embodiment is different from the display device 600 of the previous embodiments mainly in the design of the electrochromic medium 320.

As indicated in FIG. 14, in the display device 1010, the electrochromic medium 320 includes the first electrochromic material layer 330, the electrolyte layer 360, and a second electrochromic material layer 350. The second electrochromic material layer 350 is disposed on the second transparent electrode 340. The electrolyte layer 360 is located between the first electrochromic material layer 330 and the second electrochromic material layer 350. Via the arrangement of the electrochromic block 900, the background light image is shielded, and the display surface 1010A of the display device 1010 may only display predetermined images, and the contrast of the display image of the transparent display device is increased.

As indicated in FIG. 14, the first transparent electrode 310 and the second transparent electrode 340 are electrically insulated from each other. In the embodiment, after the device is energized, a chemical reaction of the first electrochromic material layer 330 occurs on the first transparent electrode 310 and the color of the first electrochromic material layer 330 is changed, and a chemical reaction of the second electrochromic material layer 350 occurs on the second transparent electrode 340 and the color of the second electrochromic material layer 350 is changed. For example, the overall color of the electrochromic material layers changes to black. Therefore, the background light image is shielded, and the display surface 1010A of the display device 1010 may only display predetermined images. After the color changes occur, the color of the first electrochromic material layer 330 may be complimentary to the color of the second electrochromic material layer 350.

In the embodiment, the second electrochromic material layer 350 may be the same as the above-mentioned first electrochromic material layer 330 and/or the above-mentioned electrochromic material. For example, the second electrochromic material layer 350 may include at least one of transition metal oxide, Prussian blue, viologen, conducting polymer, metallopolymer, and metal phthalocyanines. In other words, the first electrochromic material layer 330 and the second electrochromic material layer 350 may include the same or different materials, and may respectively be formed of at least one of the above materials.

Figure 15:
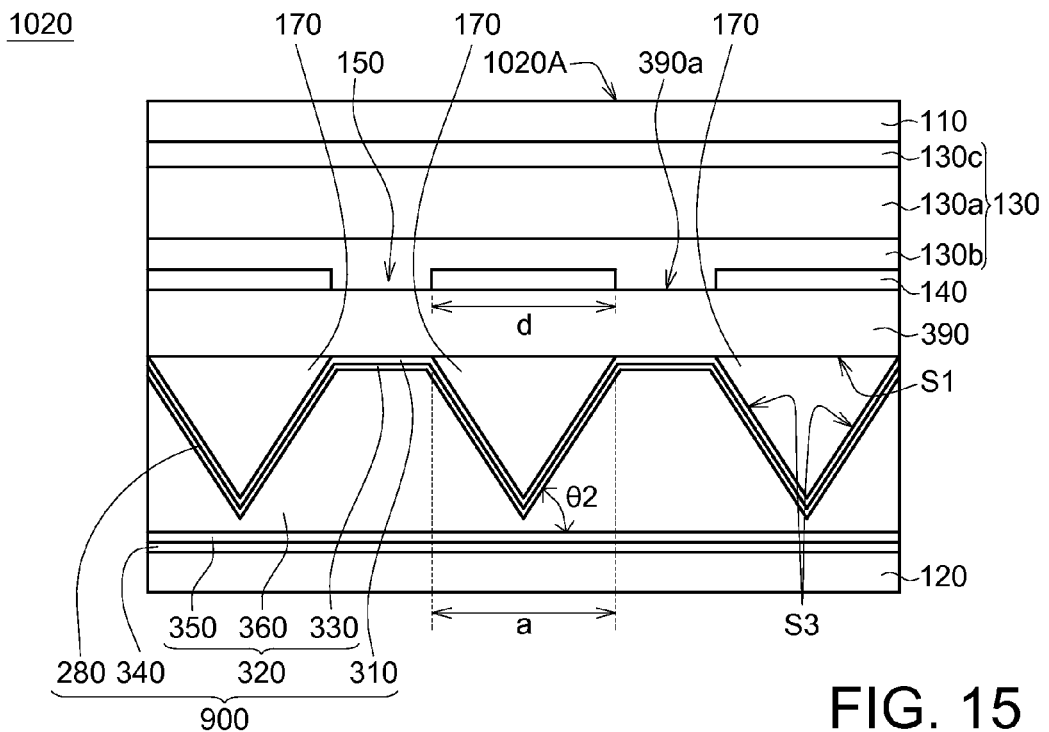
FIG. 15 is a cross-sectional view of a display device according to a still further another embodiment of the present disclosure.

FIG. 15 is a cross-sectional view of a display device according to a still further another embodiment of the present disclosure. In the present embodiment, the components common to those in the above embodiments retain the same numeric designations, and related descriptions already disclosed above are not repeated here to simplify the description.

In the present embodiment as indicated in FIG. 15, the display device 1020 may be realized by a transparent display device. That is, apart from the message displayed on the display surface 1020A of the display device 1020, the background light coming from the back of the display device 1020 and passing through the display device 1020 may also be viewed on the display surface 1020A of the display device 1020. The display device 1020 of the present embodiment is different from the display device 1010 of the previous embodiments mainly in that the conductive layer 280 is transparent. As indicated in FIG. 15, the conductive layer 280 is connected to the first transparent electrode 310 forming a plane transparent electrode layer. In other words, the conductive layer 280 and the first transparent electrode 310 are in fact an integrated transparent electrode layer formed by the same manufacturing process. Via the arrangement of the electrochromic block 900, the background light image is shielded, and the display surface 1020A of the display device 1020 may only display predetermined images, and the contrast of the display image of the transparent display device is increased.

Figure 16:
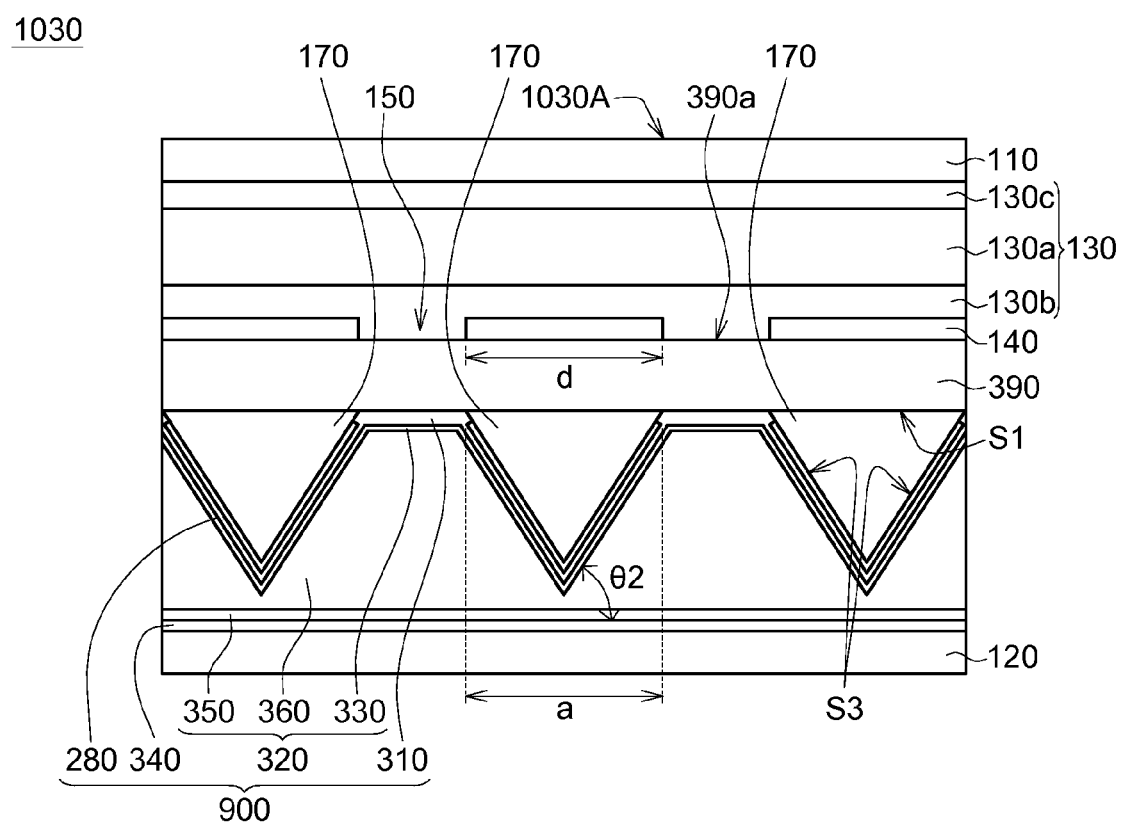
FIG. 16 is a cross-sectional view of a display device according to a still further alternate embodiment of the present disclosure.

FIG. 16 is a cross-sectional view of a display device according to a still further alternate embodiment of the present disclosure. In the present embodiment, the components common to those in the above embodiments retain the same numeric designations, and related descriptions already disclosed above are not repeated here to simplify the description.

In the present embodiment as indicated in FIG. 16, the display device 1030 may be realized by a transparent display device. That is, apart from the message displayed on the display surface 1030A of the display device 1030, the background light coming from the back of the display device 1030 and passing through the display device 1030 may also be viewed on the display surface 1030A of the display device 1030. The display device 1030 of the present embodiment is different from the display device 1020 of the previous embodiments mainly in that the first transparent electrode 310 is further disposed on the conductive layer 280. As indicated in FIG. 16, the first transparent electrode 310 is a plane transparent electrode layer covering the opening 150 and the conductive layer 280. In other words, the first electrochromic material layer 330 is formed on the first transparent electrode 310, and a portion of the first transparent electrode 310 is formed on the conductive layer 280. Via the arrangement of the electrochromic block 900, the background light image is shielded, and the display surface 1030A of the display device 1030 may only display predetermined images, and the contrast of the display image of the transparent display device is increased.

In an embodiment, the material of the first substrate 110 and the second substrate 120 may respectively include glass, metal, plastic material or polymer material, such as polyimide (PI), hybrid PI, polyethylene terephthalate (PET), polyethersulfone (PES), polyacrylate (PA), polyethylene naphthalate (PEN), polycarbonate (PC), polynorbornene (PNB), polyetherimide (PEI), polyetheretherketone (PEEK), cyclo olefin polymer (COP), poly(methyl methacrylate) (PMMA), fiberglass reinforced plastic substrate, and etc. In an embodiment as indicated in FIG. 1A, the first substrate 110 or the second substrate 120 may have a thickness T1 between 1-700 micrometers ($\mu m$) and preferably between 5-30 $\mu m$.

In an embodiment, the insulating structure 170 may be formed of at least one of positive photoresist, negative photoresist, heat-curable polymer, UV-curable polymer, or other polymer material. The insulating structure 170 may have a thickness H between 5 $\mu m$-300 $\mu m$. The reflective layer 180 may be formed of a metal, such as aluminum, titanium, molybdenum, magnesium, neodymium, silver, or a metal oxide comprising these metals, or an alloy thereof. The reflective layer 180 may have a thickness T2 between 50 nm-1 $\mu m$. The planarization layer 190 may be formed of positive photoresist, negative photoresist or other transparent polymer materials. The planarization layer 190 may have a thickness T3 between 50 nm-5 $\mu m$.

In the display devices disclosed in the above embodiments of the present disclosure having an optical guiding structure, the transmittance for the ambient light coming from the back of the displays may be increased, and f the user is further enable to view the image behind the displays. In the display devices disclosed in the above embodiments of the present disclosure having electrochromic blocks, the background light image may be shielded, and the display surfaces of the display devices may only display predetermined images, and the contrast of the display images of the transparent display devices is increased.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A display device, comprising:
   a first substrate;
   a second substrate disposed opposite to the first substrate, wherein the first substrate is located adjacent to a display surface of the display device;
   a display element layer disposed between the first substrate and the second substrate;
   a non-transparent structure disposed between the display element layer and the second substrate and defining at least one opening of the display device;
   an optical guiding structure disposed on the non-transparent structure and corresponding to the at least one opening, wherein the non-transparent structure is located between the optical guiding structure and the display element layer, and wherein the optical guiding structure comprises a plurality of insulating structures, and each of the insulating structures has a first surface adjacent to the non-transparent structure and side surfaces connected to the first surface; and
   a reflective layer disposed on the side surfaces, wherein an ambient light entering the display device via a side of the second substrate is reflected by the reflective layer and exists via the at least one opening.

2. The display device according to claim 1, wherein each of the insulating structures further has a second surface opposite to the first surface and connected to the first surface via the side surfaces, and an angle formed between one of the side surfaces and an extension line of the second surface is greater than or equal to 50°.

3. The display device according to claim 1, wherein each of the insulating structures further has a second surface opposite to the first surface, and an area of the first surface is greater than an area of the second surface.

4. The display device according to claim 1, wherein the side surfaces of one of the insulating structures are connected to each other, an extension line extending from a top of each of the insulating structures has an extending direction parallel to the first surface of each of the insulating structures, and an angle formed between one of the side surfaces and the extension line is greater than or equal to 50°.

5. The display device according to claim 1, wherein the reflective layer comprises a metal, a metal oxide, an alloy, or a combination thereof, formed from at least one of aluminum, titanium, molybdenum, magnesium, neodymium, silver, or a combination thereof.

6. The display device according to claim 1, further comprising a planarization layer disposed between the display element layer and the non-transparent structure.

7. The display device according to claim 1, wherein the display element layer comprises a liquid crystal display (LCD) element, an organic light emitting diode (OLED) display element, or an electrowetting display (EWD) element.

8. A display device, comprising:
   a first substrate;
   a second substrate disposed opposite to the first substrate, wherein the first substrate is located adjacent to a display surface of the display device;
   a display element layer disposed between the first substrate and the second substrate;
   a non-transparent structure disposed between the display element layer and the second substrate and defining at least one opening of the display device;
   a plurality of insulating structures disposed on the non-transparent structure, wherein the non-transparent structure is located between the insulating structures and the display element layer, and wherein each of the insulating structures has a first surface adjacent to the non-transparent structure and side surfaces connected to the first surface; and
   an electrochromic block located between the non-transparent structure and the second substrate, comprising:
      a first transparent electrode disposed corresponding to the at least one opening;
      a conductive layer disposed on the side surfaces of the insulating structures; and
      an electrochromic medium adjacent to the first transparent electrode and the conductive layer.

9. The display device according to claim 8, wherein the electrochromic medium comprises an electrochromic material and an electrolyte.

10. The display device according to claim 9, wherein the electrochromic material comprises at least one of transition metal oxide, Prussian blue, viologen, conducting polymer, metallopolymer, and metal phthalocyanines, and the electrolyte comprises at least one of lithium-ion solution, hydrogen-ion solution, sodium-ion solution, potassium-ion solution, propylene carbonate, ethylene carbonate, and dimethyl carbonate.

11. The display device according to claim 8, wherein the side surfaces of one of the insulating structures are connected to each other.

12. The display device according to claim 8, wherein the first transparent electrode is located between the display element layer and the electrochromic medium or located between the electrochromic medium and the second substrate.

13. The display device according to claim 8, wherein the conductive layer is connected to the first transparent electrode, electrochromic block further comprises a second transparent electrode disposed on the second substrate, and the electrochromic medium comprises:
   a first electrochromic material layer disposed on the first transparent electrode and the conductive layer; and
   an electrolyte layer located between the first electrochromic material layer and the second transparent electrode.

14. The display device according to claim 13, wherein the conductive layer and the first transparent electrode are formed of the same material.

15. The display device according to claim 13, wherein the first transparent electrode is disposed on the conductive layer.

16. The display device according to claim 13, wherein the electrochromic medium further comprises:
   a second electrochromic material layer disposed on the second transparent electrode, wherein the electrolyte layer is located between the first electrochromic material layer and the second electrochromic material layer.

17. The display device according to claim 16, wherein the conductive layer and the first transparent electrode are formed of the same material.

18. The display device according to claim 16, wherein the first transparent electrode is disposed on the conductive layer.

19. The display device according to claim 13, wherein an angle formed between the second transparent electrode and the conductive layer is smaller than 180°.

20. The display device according to claim 8, wherein an angle formed between the first transparent electrode and the conductive layer is smaller than 180°.

* * * * *